April 19, 1949. C. L. READ 2,467,855
METHOD OF DECOMPOSING ACID SLUDGE
Original Filed Dec. 26, 1942
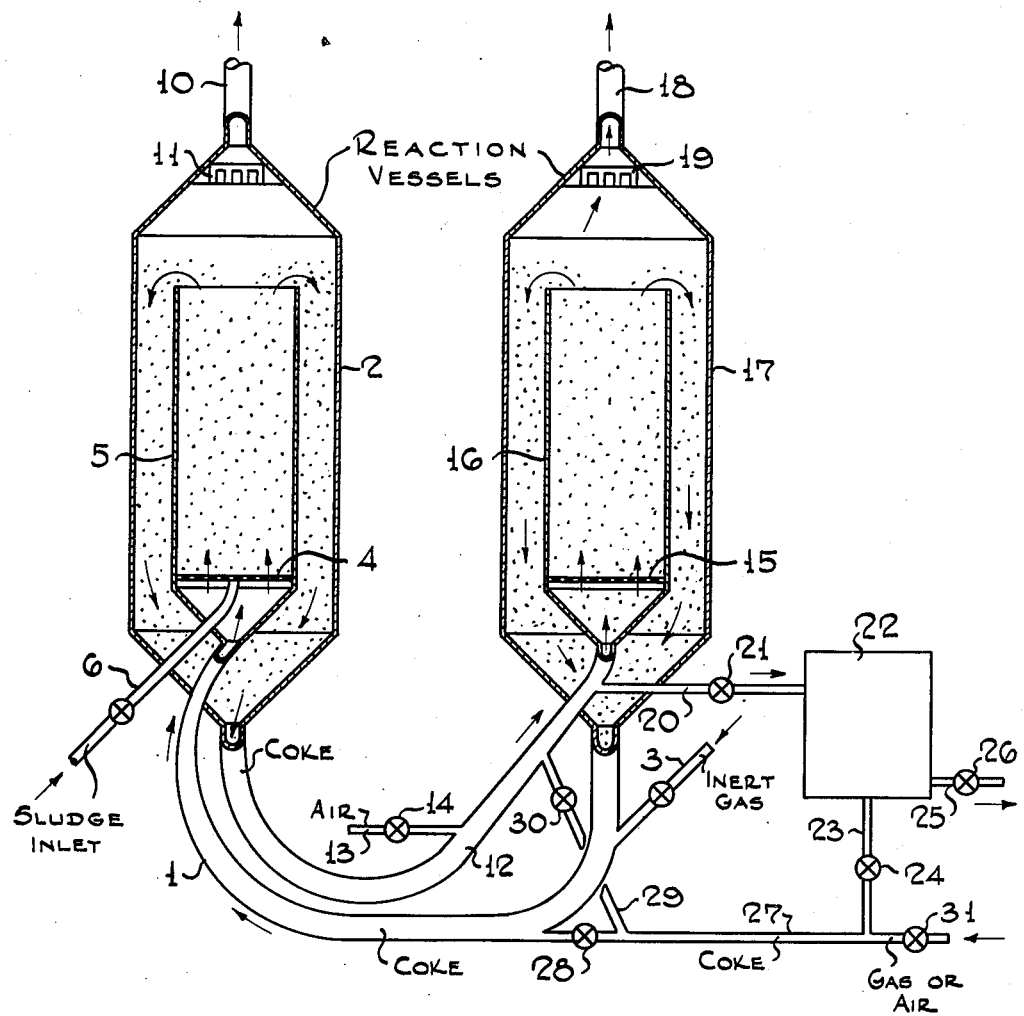
Chester L. Read Inventor Patented Apr. 19, 1949

2,467,855

UNITED STATES PATENT OFFICE 2,467,855

METHOD OF DECOMPOSING ACID SLUDGE

Chester L. Read, Westfield, N. J., assignor to Standard Oil Development Company, a corporation of Delaware Continuation of application Serial No. 470,171, December 26, 1942. This application January 27, 1947, Serial No. 724,509

2 Claims. (Cl. 23—177)

This is a continuation of U. S. patent application 470,171 (now abandoned) filed December 26, 1942, for Chester L. Read.

Acid sludges formed on treating petroleum oils with sulfuric acid formerly were hydrolyzed with water and steam to effect a separation into oil and weak acid after which the acid was concentrated for reuse. The separation was never entirely complete and generally resulted in the recovery of an impure black separated acid. This separated acid generally could be concentrated to the high strength but not of sufficient purity necessary for some uses.

Another method of recovering the sulfuric acid was in heating the acid sludge to about 550° F. in order to decompose it into sulfur dioxide gas, solid coke, water vapor and a small amount of hydrocarbon vapor. The sulfur dioxide gas, after being separated from the other ingredients could be readily processed in a contact sulfuric acid plant to pure sulfuric acid of any desired strength. In the methods used heretofore, the sulfuric acid sludge was decomposed by feeding into a rotary kiln which contained ignited coke where the heat contacted was transferred to the sludge and resulted in the breakdown reaction to separate the sulfur dioxide. The strong gas from the decomposition kiln was then cooled to condense out moisture and condensable oil, passed through a furnace to burn out any non-condensable hydrocarbon gases, after which it was cooled, dried and converted to sulfuric acid. The disadvantage of this process was in the use of the rotary kiln where excessive amounts of coke were used and where it was extremely difficult to maintain a uniform temperature in the decomposition of the sulfuric acid sludge.

An object of this invention is to regulate the temperature at which the decomposition of the sulfuric acid sludge may be obtained.

Another object of this invention is to regulate the time during which the sulfuric acid sludge is submitted to decomposition temperatures.

These and other objects of the invention will be readily understood on reading the following description with reference to the accompanying drawing wherein is shown a method of decomposing the sulfuric acid sludge.

Referring to the drawing, numeral 1 indicates a pipe through which coke heated to incandescence is passed into reaction vessel 2. The coke is in the form of a very fine powder and sufficient inert or non-oxidizing gas is provided through pipe 3 to fluidize the powdered coke. Gases such as nitrogen, carbon dioxide or flue gas, may be used. This fluidized powdered coke behaves like a liquid and has many of the hydraulic properties of a liquid in that 1. It flows through pipes under the influence of an unbalanced force such as gravity, differential pressure, etc.
2. It tends to assume the shape of the container.
3. It flows through conduits or pipes accompanied by a pressure drop.
4. Gas seals can be produced in the same manner as a liquid is used to seal a gas holder.
5. The fluidized finely divided material assumes an upper phase boundary "level" in a container when a constant supply of aeration gas is furnished.

Within the reaction vessel 2 the fluidized coke is passed through a grid 4 in the lower part of cylinder 5 inside of reaction vessel 2. Sludge is introduced into cylinder 5 above the grid 4 by line 6 and immediately mixed with the fluidized incandescent coke, the temperature of the coke in line 1 being regulated so that the temperature of the fluidized mixture of the coke and sludge in cylinder 5 is maintained at about 550° F.

The mixture of fluidized coke and sludge passes upward through cylinder 5 in the reaction vessel 2 and at the above temperature decomposes to sulfur dioxide, water in the form of steam, a mixture of hydrocarbons and coke. The reaction is completed as the mixture passes upward through the cylinder 5 and the velocity of the mixture is reduced at top of cylinder 5 to such an extent that the gases and coke particles separate. The sulfur dioxide, steam and the volatile hydrocarbons are removed from the reaction vessel 4 by means of pipe 10 after passing through a rotary separator 11. The coke passes through space between the walls of the reaction vessel 2 and cylinder 5 and is removed by means of pipe 12. Air may be provided by means of pipe 13 provided with valve 14 to fluidize and aid the flow of the coke through grid 15 in the cylinder 16 within reaction vessel 17. Above the grid 15 the coke is partly burned and heated to incandescence. The gas formed after disengaging from the coke at top of cylinder 16 is removed by means of pipe 18 after passing through a rotary separator 19 and the coke is then passed to the bottom of vessel 17 and removed through pipe 1 to the reaction vessel 2. Since the thermal decomposition of the sludge in reaction vessel 2 produces more coke than is required for the heating of sludge to the decomposing temperature, a substantial fraction of the coke may be removed from the line 12 by means of pipe 20 provided with valve 21 to a storage bin 22 from which it may be recycled to the reaction vessel 2 by pipe 23 or removed through pipe 25 provided with valve 26.

In starting the operation, coke may be withdrawn from bin 22 by lines 23, 27, and 29, passed by line 12 to reaction vessel 17. Coke from bin 22 may also be passed through lines 23 and 27 to line 1 to regulate the temperature of the incandescent coke in line 1. This coke may be fluidized by means of an inert gas introduced by line 31.

The sulfur dioxide gas, steam and volatile hydrocarbons are cooled to separate the steam and to condense out some of the hydrocarbons. The residual sulfur dioxide gas is then passed through a furnace where any fixed hydrocarbon gases are burned out and then used in the manufacture of sulfuric acid.

I claim:

1. The method of coking acid sludge recovered from the sulfuric acid treatment of hydrocarbons which comprises the steps of maintaining a quantity of finely divided coke within a confined contacting zone, said coke having been produced as defined hereinbelow, introducing a substantially inert gasiform fluid into said zone at a low point, said fluid being introduced at a rate sufficient to maintain said coke in a suspended dense turbulent condition, supplying acid sludge to said coking zone and commingling the acid sludge and finely divided coke whereby the acid sludge is decomposed to produce additional quantities of coke and gasiform products, removing gasiform fluid from said zone, continuously removing a portion of the coke from said zone, introducing at least a portion of the coke thus removed into a separate combustion zone, maintaining a quantity of finely divided coke within said combustion zone, introducing an oxidizing gas at a low point of said combustion zone and passing said gas upwardly through the said solids at a rate sufficient to maintain the said coke in a suspended dense turbulent condition, consuming at least a portion of said coke by burning within said combustion zone thereby producing a quantity of hot finely divided coke, removing a portion of the highly heated coke from said combustion zone and transferring the removed highly heated coke to said coking zone.

2. The process of claim 1 wherein the coke removed from the coking zone is transferred to the combustion zone by means of the oxidizing gas being supplied to said combustion zone.

CHESTER L. READ.

REFERENCES CITED

The following references are of record in the file of this patent:

UNITED STATES PATENTS

| Number | Name | Date |
|---|---|---|
| 1,984,380 | Odell | Dec. 18, 1934 |
| 2,223,934 | Barnes | Dec. 3, 1940 |
| 2,337,684 | Scheineman | Dec. 28, 1943 |
| 2,412,667 | Arveson | Dec. 17, 1946 |